United States Patent
Carr

(10) Patent No.: US 6,569,212 B2
(45) Date of Patent: *May 27, 2003

(54) PHTHALOCYANINE INK-JET DYES

(75) Inventor: Kathryn Carr, Manchester (GB)

(73) Assignee: Avecia Limited, Blackley (GB)

( * ) Notice: Subject to any disclaimer, the term of this patent is extended or adjusted under 35 U.S.C. 154(b) by 97 days.

This patent is subject to a terminal disclaimer.

(21) Appl. No.: 09/793,497

(22) Filed: Feb. 27, 2001

(65) Prior Publication Data

US 2001/0011396 A1 Aug. 9, 2001

Related U.S. Application Data

(63) Continuation of application No. 09/403,722, filed as application No. PCT/GB98/01015 on Apr. 6, 1998, now abandoned.

(30) Foreign Application Priority Data

Apr. 26, 1997 (GB) ............................................. 9708533
Apr. 26, 1997 (GB) ............................................. 9708535

(51) Int. Cl.$^7$ .................... C09B 47/26; C09D 11/02; D06P 5/30
(52) U.S. Cl. .................. 8/445; 8/661; 8/919; 540/133; 540/134; 540/139; 106/31.49
(58) Field of Search .......................... 8/445, 661, 919; 540/124, 133, 134, 139; 106/31.49

(56) References Cited

U.S. PATENT DOCUMENTS

| | | | |
|---|---|---|---|
| 3,711,508 A | * | 1/1973 | Groll |
| 4,033,980 A | | 7/1977 | Meininger et al. ........ 260/314.5 |
| 4,111,650 A | | 9/1978 | Lacroix et al. ................ 8/85 R |
| 4,318,883 A | | 3/1982 | Polony et al. ................. 422/22 |
| 5,248,538 A | | 9/1993 | Kovacs et al. ................ 428/64 |
| 5,489,330 A | | 2/1996 | Wunderlich ............... 106/20 D |
| 6,015,896 A | | 1/2000 | Mistry et al. ................ 540/134 |
| 6,025,486 A | | 2/2000 | Mistry ......................... 540/122 |
| 6,190,422 B1 | * | 2/2001 | Carr |

FOREIGN PATENT DOCUMENTS

| | | |
|---|---|---|
| DE | 28 12 261 | 9/1978 |
| EP | 0 468 649 A1 | 1/1992 |
| EP | 0 519 395 A1 | 12/1992 |
| EP | 0 596 383 A1 | 5/1994 |
| FR | 2.033.597 | 12/1970 |
| WO | 97/13811 | 4/1997 |
| WO | 97/13814 | 4/1997 |

OTHER PUBLICATIONS

Patent Abstracts of Japan, vol. 013, No. 372 (C–627) Aug. 17, 1989 & JP 01 126381 A (Richo Co Ltd.), May 18, 1989.

* cited by examiner

Primary Examiner—Margaret Einsmann
(74) Attorney, Agent, or Firm—Pillsbury Winthrop LLP

(57) ABSTRACT

Phthalocyanine compounds of Formula (1) have utility as colorants in inks for ink-jet printing, where Formula (1) represents:

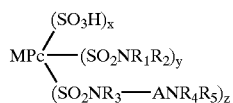

and all IJP-effective forms of such compounds; and in which
M represents a metal or H;
Pc represents a phthalocyanine nucleus of Formula (2)

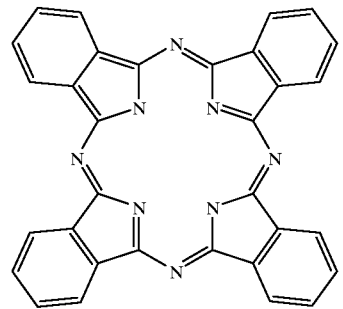

x+y+z represents an average from 3 to 4; and z may be zero.
A represents $C_{1-4}$-alkylene;
$R_1$, $R_3$ each independently represent H or $C_{1-4}$-alkyl;
$R_4$ represents H; or $C_{1-4}$-alkyl optionally substituted with hydroxy;
$R_5$ represents a carboxylic acid substituted aryl group; and
$R_2$ represents H, $C_{1-4}$-alkyl or a group of formula BD where:
B represents $C_{1-4}$-alkylene; and
D represents $NR_6R_7$; or $SC_{1-4}$alkyleneSO$_3$H; where:
$R_6$ represents H; or $C_{1-4}$alkyl, optionally subsititued by hydroxy;
$R_7$ represents H; $C_{1-4}$alkyl, optionally subsititued by hydroxy or morphlino; or
$R_6$ and $R_7$ together with the N atom to which they are attached form a morpholino or piperazino ring.

16 Claims, No Drawings

PHTHALOCYANINE INK-JET DYES

This is a continuation of application Ser. No. 09/403,722, filed Jan. 7, 2000, now abandoned which is a 371 filing based on PCT/GB98/01015, filed Apr. 6, 1998.

This invention relates to compounds, to ink compositions comprising them and to the use of such inks in ink jet printing ("IJP"). IJP is a non-impact printing technique in which droplets of ink are ejected through a fine nozzle onto a substrate without bringing the nozzle into contact with the substrate.

There are many demanding performance requirements for colorants and inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle.

The applicant has discovered that certain phthalocyanine compounds have particular utility as colorants for use in IJP as they may produce prints with unexpectedly good optical density, light fastness and/or water fastness.

According to the present invention there is provided a compound of Formula (1):

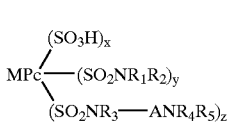

Formula (1)

which includes all IJP-effective forms of such compounds; and in which

M represents a metal or H;

Pc represents a phthalocyanine nucleus of Formula (2)

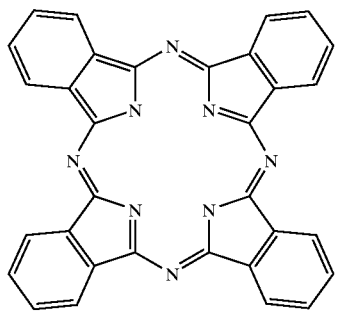

Formula (2)

x+y+z represents an average from 3 to 4; and z may be zero.

A represents $C_{1-4}$-alkylene;

$R_1$, $R_3$ each independently represent H or $C_{1-4}$alkyl;

$R_4$ represents H; or $C_{1-4}$-alkyl optionally substituted with hydroxy;

$R_5$ represents a carboxylic acid substituted aryl group; and $R_2$ represents H, $C_{1-4}$-alkyl or a group of formula BD where B represents $C_{1-4}$-alkylene; and D represents $NR_6R_7$; or $SC_{1-4}$alkyleneSO$_3$H; where $R_6$ represents H; or $C_{1-4}$alkyl, optionally subsititued by hydroxy;

$R_7$ represents H; $C_{1-4}$alkyl, optionally subsititued by hydroxy or morpholino;

or $R_6$ and $R_7$ together with the N atom to which they are attached form a morpholino or piperazino ring.

When M is a metal it is preferably selected from Li, Na, K, Mg, Ca, Ba, Al, Si, Sn, Pb, Rh, Sc, Ti, V, Cr, Mn, Fe, Co, Ni and Cu, more preferably from Sc, Ti, Va, Cr, Mn, Fe, Co, Zn, Ni and Cu and especially from Ni and Cu.

Preferred dyes of Formula (1) are either those dyes in which: $R_1$, $R_2$, $R_3$ and $R_4$ are H; A is —CH$_2$CH$_2$—; and $R_5$ is carboxylic acid substituted phenyl, more preferably 3-carboxyphenyl; or those dyes in which:

M is Cu, z is 0, $R_1$ is H, $R_2$ is BD where B is —CH$_2$CH$_2$— and D is NR$_6$R$_7$, more preferably NHCH$_2$CH$_2$OH.

It is preferred that (x+y)>z and/or x>y. More preferably either: x is an average of about 3.0 and y is an average of about 1.0 and z is zero; or x is an average of about 1.3, y is an average of about 1.2 and z is an average of about 1.5.

Any radical group mentioned herein as a substituent refers to a monovalent radical unless otherwise stated. A group which comprises a chain of three or more atoms signifies a group in which the chain may be straight or branched or the chain or part of the chain may form a ring. For example, an alkyl group may comprise: propyl which includes n-propyl and isopropyl; butyl which includes n-butyl, sec-butyl, isobutyl and tert-butyl; and an alkyl group of three or more carbon atoms may comprise a cycloalkyl group. The total number of certain atoms is specified herein for certain substituents, for example $C_{1-n}$alkyl, signifies an alkyl group having from 1 to 'n' carbon atoms. The term 'halo' as used herein signifies fluoro, chloro, bromo and iodo radicals.

The term 'IJP effective' (for example with reference to the inks, compositions, ingredients, substituents and/or compounds described herein) will be understood to mean effective for use in ink-jet printing by for example: providing desirable properties to the ink, being compatible with any inert carriers and/or diluents suitable for formulating such inks, being compatible with ink jet printers and/or capable of being ink-jet printed. In relation to the processes described herein effective compounds are those which will undergo the specified reactions to form the compounds of the present invention. To be particularly acceptable for use in IJP compounds of Formula (1) may be Ames negative.

IJP-effective forms of compounds of Formula (1) may be selected from one or more of the following (including mixtures thereof and combinations thereof in the same molecular moiety): salts, stereoisomers, zwitterions, polymorphic forms, complexes and isotopically substituted forms. Specific compounds of Formula (1) comprise those compounds exemplified herein; all IJP-effective salts thereof, preferably their potassium, sodium or ammonium salts; and IJP-effective mixtures thereof.

Compounds of Formula (1) may be in the form as shown in the structures herein (i.e. free acid form) but are preferably in the form of salts. Salts of Formula (1) may be formed from one or more organic and/or inorganic bases and/or acids and compounds of Formula (1) which are acidic and/or basic (for example acid and/or base addition salts). Salts of Formula (1) comprise all IJP-effective salts that may be formed from monovalent and/or multivalent acids and/or bases. Salts of Formula (1) also comprise all enantiomeric salts formed with IJP-effective chiral acids and/or bases and/or any mixtures of enantiomers of such salts (for example racemic mixtures). The dyes may be converted into a salt using known techniques. The present invention comprises all IJP-effective salts of Formula (1) and IJP-effective mixtures thereof.

Preferred salts of Formulae (1) are alkali metal salts (especially lithium, sodium and potassium salts), and optionally substituted ammonium salts (especially salts with ammonia and volatile amines). More preferred salts are those with a cation of formula $^+NT_4$ where each T is independently H or optionally substituted alkyl, or two groups represented by T are H or optionally substituted alkyl and the remaining two groups represented by T, together with the N atom to which they are attached, form a 5 or 6 membered ring (preferably a morpholine, pyridine or piperidine ring). Most preferably each T is independently H or $C_{1-4}$alkyl, especially H, $CH_3$ or $CH_3CH_2$, more especially H. Examples of cations which are IJP-effective comprise: $^+NH_4$, morpholinium, piperidinium, pyridinium, $(CH_3)_3N^+H$, $(CH_3)_2N^+H_2$, $H_2N^+(CH_3)(CH_2CH_3)$, $CH_3N^+H_3$, $CH_3CH_2N^+H_3$, $H_2N^+(CH_2CH_3)_2$, $CH_3CH_2CH_2N^+H3$, $CH_3CH_2CH_2N^+H_3$, $(CH_3)_2CHN^+H_3$, $N^+(CH_3)_4$, $N^+(CH_2CH_3)_4$, N-methyl pyridinium, N,N-dimethyl piperidinium and N,N-dimethyl morpholinium.

Certain compounds of Formula (1) may exist as one or more stereoisomers, for example, enantiomers, diastereoisomers, geometric isomers, tautomers, conformers and/or combinations thereof within the same moiety. The present invention comprises all IJP-effective stereoisomers of compounds of Formula (1) and IJP-effective mixtures thereof.

Certain compounds of Formula (1) may exist as one or more zwitterions, for example, moieties which comprise two or more centres of ionic charge. The present invention comprises all IJP-effective zwitterions of Formula (1) and IJP-effective mixtures thereof.

Certain compounds of Formula (1) may exist as one or more polymorphs, for example, phases, crystalline forms, amorphous forms, solid solutions, interstitial compounds and/or any mixtures thereof. The present invention comprises all IJP-effective polymorphs of Formula (1) and IJP-effective mixtures thereof.

Certain compounds of Formula (1) may exist in the form of one or more other complexes in addition to the metal complexes shown herein, for example, chelates, solvates, other organometallic complexes, and/or complexes with other IJP-effective ligands. Such complexes may be formed between an suitable substrate in which the compound of Formula (1) and/or the substrate may act as a ligand. The substrate may comprise one or more solvents to form solvates. The complexes may be non-stoichiometric, for example if the complex is a hydrate it may comprise a hemihydrate, monohydrate and/or dihydrate. The present invention comprises all IJP-effective complexes of Formula (1) and IJP-effective mixtures thereof.

Certain compounds of Formula (1) may exist as one or more isotopic forms in which one or more atoms in Formula (1) comprise one or more isotopes. The natural ratios of various isotopes may be altered by suitable means, for example certain $^{12}C$ atoms in certain compounds of Formula (1) may be substantially replaced by the less common $^{14}C$ and/or $^{13}C$ isotopes. Optionally certain isotopic forms of Formula (1) may be radio-active. Certain of the isotopic forms of Formula (1) may be used as means for selective imaging in imaging devices (for example devices using X-rays, positron emission tomography and/or nuclear magnetic resonance); and/or as tools to investigate the mode of action of compounds of Formula (1) in IJP. The present invention comprises all IJP-effective, isotopic forms of Formula (1) and IJP-effective mixtures thereof.

The present invention relates to all compounds of Formula (1) even those which may not be directly effective for use in IJP because they exhibit undesirable properties. Such compounds may nevertheless have utility in the field of the present invention for example as intermediates in the preparation and/or purification of IJP-effective compounds of Formula (1) and/or as research tools and/or diagnostic aids in relation to IJP.

Compounds of Formula (1) may be prepared the methods described below and by other suitable methods analogous to those described in the art for similar phthalocyanine compounds.

A preferred method for preparing dyes of Formula (1) comprises the following steps:

a) Preparing a compound of formula $MPc(SO_2Cl)_{x+y+z}$ using methods known per se. A preferred method preparing a compound of formula $MPc(SO_2Cl)_{x+y+z}$ comprises heating (preferably for about 1 to about 24 hours), a metal-free or metal containing phthalocyanine (optionally comprising one to four sulpho groups) with chlorosulphonic acid, preferably at a temperature above about 60° C., more preferably above about 100° C., most preferably from about 120° C. to about 165° C. Optionally this may be followed by heating (preferably for about 10 to about 48 hours, more preferably for about 10 to about 30 hours), the phthalocyanine with $PCl_3$, preferably at lower temperature than with the chlorosulphonic acid, more preferably from about 80° C. to about 105° C.

b) Condensing the compound of formula $MPc(SO_2Cl)_{x+y+z}$ in water at 0° C. with a halo amine of formula $NHR_3AX$, where X is halo, preferably chloro. More preferably the haloamine is in the form of its hydrochloride salt.

c) Treating the halogenated adduct from step b) with ammonium hydroxide and warming the reaction mixture to 40° C. for about 1 hour.

d) Reacting the material from step c) with an amine of formula $NHR_4R_5$ in aqueous solution at about 70° C. for about 3 hours to produce a dye of Formula (1).

Alternatively to prepare certain compounds of the invention, steps c) and d) above may be replaced by step c1):

c1) Reacting the material from step b) with an amine of formula $NHR_2R_3$ or a thiol of formula $HSC_{1-4}alkyleneSO_3H$, in aqueous solution at about 70° C. for about 3 hours to produce a dye of Formula (1).

The reactions leading to the formation of the present compounds may be performed under conditions that have been described in the art and compounds of Formula (1) may be isolated by known methods such as spray drying or precipitation followed by filtration.

Preferably the ink of the present invention comprises:
(a) from 0.01 to 30 parts of an IJP-effective compound of Formula (1); and
(b) from 70 to 99.99 parts of a liquid medium or a low melting point solid medium; wherein all parts are by weight and the number of parts of (a)+(b)=100.

The number of parts of component (a) is preferably from 0.1 to 20, more preferably from 0.5 to 15, and especially from 1 to 5 parts. The number of parts of component (b) is preferably from 99.9 to 80, more preferably from 99.5 to 85, especially from 99 to 95 parts.

When the medium is a liquid, preferably component (a) is completely dissolved in component (b). Preferably component (a) has a solubility in component (b) at 20° C. of at least 10%. This allows the preparation of concentrates which may be used to prepare more dilute inks and reduces the chance of the colorant precipitating if evaporation of the liquid medium occurs during storage.

Preferred liquid media include water, a mixture of water and an organic solvent and an organic solvent free from water.

When the medium comprises a mixture of water and an organic solvent, the weight ratio of water to organic solvent is preferably from 99:1 to 1:99, more preferably from 99:1 to 50:50 and especially from 95:5 to 80:20. Preferably the organic solvent comprising the mixture of water and organic solvent is a water-miscible organic solvent or a mixture of such solvents. The liquid medium may comprise water and preferably two or more, more preferably from 2 to 8, water-soluble organic solvents.

Preferred water-miscible organic solvents comprise:

$C_{1-6}$-alkanols, preferably methanol, ethanol, n-propanol, isopropanol, n-butanol, sec-butanol, tert-butanol, n-pentanol, cyclopentanol and/or cyclohexanol;

linear amides, preferably dimethylformamide and/or dimethylacetamide;

ketones and/or ketone-alcohols, preferably acetone, methyl ether ketone, cyclohexanone and/or diacetone alcohol;

water-miscible ethers, preferably tetrahydrofuran and/or dioxane;

diols, preferably $C_{2-12}$diols (for example pentane-1,5-diol, ethylene glycol, propylene glycol, butylene glycol, pentylene glycol, hexylene glycol and/or thiodiglycol) and/or oligo- and/or poly-alkyleneglycols (for example diethylene glycol, triethylene glycol, polyethylene glycol and/or polypropylene glycol);

triols, preferably glycerol and/or 1,2,6-hexanetriol;

$C_{1-4}$alkyl ethers of diols, preferably mono$C_{1-4}$alkyl ethers of $C_{2-12}$diols: {for example 2-methoxyethanol, 2-(2-methoxyethoxy)ethanol, 2-(2-ethoxyethoxy)-ethanol, 2-[2-(2-methoxyethoxy)ethoxy] -ethanol, 2-[2-(2-ethoxyethoxy)-ethoxy]-ethanol and/or ethyleneglycol monoallyl ether};

cyclic amides, preferably 2-pyrrolidone, N-methyl-2-pyrrolidone, N-ethyl-2-pyrrolidone, caprolactam and/or 1,3-dimethylimidazolidone;

cyclic esters, preferably caprolactone;

sulphoxides, preferably dimethyl sulphoxide and/or sulpholane; and/or all IJP-effective mixtures thereof.

More preferred water-soluble organic solvents are selected from:

cyclic amides (e.g. 2-pyrrolidone, N-methyl-pyrrolidone and N-ethyl-pyrrolidone);

diols, (e.g. 1,5-pentane diol, ethyleneglycol, thiodiglycol, diethyleneglycol and triethyleneglycol);

$C_{1-4}$alkyl ethers of diols (e.g. 2-methoxy-2-ethoxy-2-ethoxyethanol); and all IJP-effective mixtures thereof.

A preferred liquid medium comprises:

(a) from 75 to 95 parts water; and
(b) from 25 to 5 parts in total of one or more solvents selected from:

diethylene glycol, 2-pyrrolidone, thiodiglycol, N-methylpyrrolidone, cyclohexanol, caprolactone, caprolactam and pentane-1,5-diol;

where the parts are by weight and the sum of the parts (a)+(b)=100.

Another preferred liquid medium comprises:

(a) from 60 to 80 parts water;
(b) from 2 to 20 parts diethylene glycol; and
(c) from 0.5 to 20 parts in total of one or more solvents selected from:

2-pyrrolidone, N-methylpyrrolidone, cyclohexanol, caprolactone, caprolactam, pentane-1,5-diol and thiodiglycol;

where the parts are by weight and the sum of the parts (a)+(b)+(c)=100.

Examples of further IJP-effective media for inks of the present invention comprise a mixture of water and one or more organic solvents are described in U.S. Pat. No. 4,963,189, U.S. Pat. No. 4,703,113, U.S. Pat. No. 4,626,284 and EP 0425150-A.

When the liquid medium comprises an organic solvent free from water, (i.e. less than 1% water by weight) the solvent preferably has a boiling point of from 30° to 200° C., more preferably of from 40° to 150° C., especially from 50 to 125° C. The organic solvent may be water-immiscible, water-miscible or a mixture of such solvents. Preferred water-miscible organic solvents comprise any of those described above and mixtures thereof. Preferred water-immiscible solvents comprise aliphatic hydrocarbons; esters (for example ethyl acetate) chlorinated hydrocarbons (for example dichloromethane), ethers (for example diethyl ether) and mixtures thereof.

When the liquid medium comprises a water-immiscible organic solvent, preferably it comprises a polar solvent (for example a $C_{1-4}$alkanol) to enhance the solubility of the dye in the liquid medium. It is especially preferred that where the liquid medium is an organic solvent free from water it comprises a ketone (especially methyl ethyl ketone) and/or an alcohol (especially a $C_{1-4}$alkanol, more especially ethanol or propanol).

The organic solvent free from water may be a single organic solvent or a mixture of two or more organic solvents. It is preferred that when the medium is an organic solvent free from water it is a mixture of 2 to 5 different organic solvents. This allows a medium to be selected which gives good control over the drying characteristics and storage stability of the ink.

Ink media comprising an organic solvent free from water are particularly useful where fast drying times are required and particularly when printing onto hydrophobic and non-absorbent substrates, for example plastics, metal and glass.

Preferred low melting solid media have a melting point in the range from 60° C. to 125° C. Suitable low melting point solids include long chain fatty acids or alcohols, preferably those with $C_{18-24}$chains, and sulphonamides. The dye of Formula (1) may be dissolved in the low melting point solid or may be finely dispersed in it.

The ink may also contain additional components conventionally used in inks for IJP, for example viscosity and surface tension modifiers, corrosion inhibitors, biocides, kogation reducing additives and surfactants which may be ionic or non-ionic.

A further aspect of the invention provides a process for printing an image on a substrate comprising applying to the substrate by means of an ink jet printer, an ink of the present invention as defined herein.

The ink jet printer preferably applies the ink to the substrate in the form of droplets which are ejected through a small orifice onto the substrate. Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric ink jet printers the oscillation of a small crystal causes ejection of the ink from the orifice.

The substrate is preferably paper, plastic, a textile, metal or glass, more preferably paper, an overhead projector slide or a textile material, especially paper. Preferred papers are plain or treated papers which may have an acid, alkaline or neutral character.

A further aspect of the present invention provides a paper, an overhead projector slide or a textile material printed with an ink and/or a colorant as defined herein and/or by means of a process as defined herein.

When the substrate is a textile material the ink according to the invention is preferably applied thereto by:
i) applying the ink to the textile material using an ink jet printer; and
ii) heating the printed textile material at a suitable temperature, preferably from 50° C. to 250° C., to fix the ink on the material.

Preferred textile materials are natural, synthetic and semi-synthetic materials. Examples of preferred natural textile materials include wool, silk, hair and cellulosic materials, particularly cotton, jute, hemp, flax and linen. Examples of preferred synthetic and semi-synthetic materials include polyamides, polyesters, polyacrylonitriles and polyurethanes.

Preferably the textile material has been treated with an aqueous pre-treatment composition comprising a thickening agent and optionally a water-soluble base and a hydrotropic agent and dried prior to step i) above.

The pre-treatment composition preferably comprises a solution of the base and the hydrotropic agent in water containing the thickening agent. Particularly preferred pre-treatment compositions are described more fully in EP 0534660-A.

The invention is further illustrated by the following Examples in which all parts and percentages are by weight unless otherwise stated.

EXAMPLE 1

Preparation of

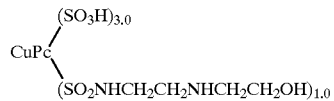

a) Preparation of $CuPc(SO_2Cl)_4$

Copper phthalocyanine (115 g) was added in portions to stirred chlorosulphonic acid (308 ml) over 30 minutes keeping the temperature below 50° C. The mixture was stirred for 30 minutes before being heated gradually to 140° C., at which temperature it was stirred for 3 hours. The mixture was cooled to 40° C. and phosphorus trichloride (52.5 g) was added in portions over 30 minutes, whilst the temperature was kept below 50° C. The mixture was stirred overnight at room temperature and then cooled to 0° C. and poured onto a mixture of ice (700 g), water (700 g), concentrated hydrochloric acid (40 ml) and sodium chloride (100 g). The mixture was stirred at 0° C. for 30 minutes. The precipitated product was collected by filtration at reduced pressure and washed with ice-cold hydrochloric acid solution (0.5 M, 1.5 l) to obtain a paste of $CuPc(SO_2Cl)_4$.

b) Reaction with b-chloroethylammonium Chloride to Obtain:

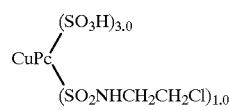

A solution of b-chloroethylammonium chloride (34.7 g) in water (1 l) was cooled to 0° C. and the sulphonyl chloride paste from step a) was added. The pH of the mixture was adjusted to 7 to 8 with dilute sodium hydroxide solution. The mixture was stirred at 0° C. for 1 hour, heated to 40° C. and stirred at that temperature for a further hour and then cooled to room temperature. The pH of the mixture was adjusted to 1.5 with concentrated hydrochloric acid and the mixture was stirred for 1 hour. The precipitated product was collected by filtration at reduced pressure and washed with dilute hydrochloric acid solution (0.5 M, 1.5 l) to obtain the above chloro compound.

c) Reaction with Ethanolamine to Produce Example 1

A solution of the chloro compound from step b) (38 g) and ethanolamine (25 g) in water (350 ml) was stirred at 70° C. for 4 hours. Sodium chloride (25% w/v) was added to the warm mixture and the stirrring was continued for a further 30 minutes. The mixture was allowed to cool and the resultant precipitate was collected by filtration at reduced pressure and washed withcold brine (75 ml) and dried to produce the title dye.

EXAMPLE 2

Preparation of

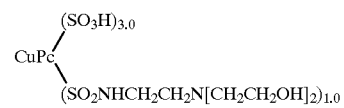

Steps a) and b) are carried out as Example 1 above.

c) Reaction with Diethanolamine to Produce Example 2

A solution of the chloro compound from step b) (38 g) and diethanolamine (42 g) in water (350 ml) was stirred at 70° C. for 4 hours. The product was then isolated as described above in Example 1 step c) to produce the title dye.

EXAMPLE 3

Preparation of

Steps a) and b) are carried out as Example 1 above.

c) Reaction with 4-(2-aminoethyl)morpholine to Produce Example 3

A solution of the chloro compound from step b) (38 g) and 4-(2-aminoethyl)morpholine (52 g) in water (350 ml) was stirred at 70° C. for 4 hours. The product was then isolated as described above in Example 1 step c) to produce the title dye.

EXAMPLE 4

Preparation of

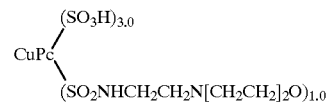

Steps a) and b) are carried out as Example 1 above.

c) Reaction with Morpholine to Produce Example 4

A solution of the chloro compound from step b) (38 g) and morpholine (35 g) in water (350 ml) was stirred at 70° C. for 4 hours. The product was then isolated as described above in Example 1 step c) to produce the title dye.

EXAMPLE 5

Preparation of

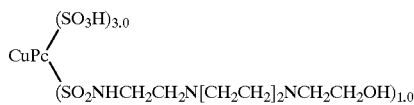

Steps a) and b) are carried out as Example 1 above.
c) Reaction with 1-(2-hydroxyethyl)piperazine to Produce Example 5

A solution of the chloro compound from step b) (38 g) and 1-(2-hydroxyethyl)piperazine (47 ml) in water (350 ml) was stirred at 70° C. for 4 hours. The product was then isolated as described above in Example 1 step c) to produce the title dye.

EXAMPLE 6

Preparation of

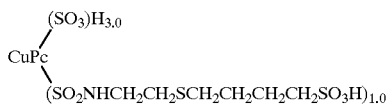

Steps a) and b) are carried out as Example 1 above.
c) Reaction with 3-mercaptopropane Sulphonic Acid to Produce Example 6

A solution of the chloro compound from step b) (35 g) and the sodium salt of 3-mercaptopropane sulphonic acid (26 g) in water (350 ml) was stirred at 50° C. and pH 9 for 7 hours. The product was then isolated as described above in Example 1 step c) [with the modification that the pH of the mixture after adding sodium chloride was adjusted to 1.0 with concentrated hydrochloric acid] to produce the title dye.

EXAMPLE 7

Preparation of

Steps a) and b) are carried out as Example 1 above.
c) Reaction with 1-(2-aminoethyl)piperazine to Produce Example 7

A solution of the chloro compound from step b) (38 g) and 1-(2-aminoethyl)piperazine (52 ml) in water (350 ml) was stirred at 70° C. for 4 hours. The product was then isolated as described above in Example 1 step c) to produce the title dye.

EXAMPLE 8

Preparation of

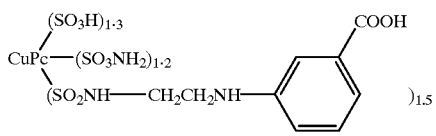

Step a) is carried out as Example 1 above.
b) Reaction with b-chloroethylammonium Chloride to Obtain:

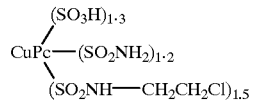

A solution of b-chloroethylammonium chloride (34.7 g) in water (1 l) was cooled to 0° C. and the sulphonyl chloride paste from step a) was added. The pH of the mixture was adjusted to 7 to 8 with dilute ammonium hydroxide solution. The mixture was stirred at 0° C. for 1 hour, heated to 40° C. and stirred at that temperature for a further hour and then cooled to room temperature. The pH of the mixture was adjusted to 1.5 with concentrated hydrochloric acid and the mixture was stirred for 1 hour. The precipitated product was collected by filtration at reduced pressure and washed with dilute hydrochloric acid solution (0.5 M, 1.5 l) to obtain the above chloro compound.
c) Reaction with 3-aminobenzoic Acid to Produce Example 8

A solution of the chloro compound from step b) (50 g) and 3-aminobenzoic acid (35 g) in water (300 ml) at pH 7.0 was heated to 70° C. and stirred at that temperature for 4 hours. Sodium chloride (25% w/v) was added and the pH of the mixture was adjusted to 6.0 with concentrated hydrochloric acid. The resultant precipitate was collected by filtration at reduced pressure and washed with acid brine (25%, 100 ml, pH 4) and methanol (100 ml) to obtain as the product the title dye.

Salts

The exemplified sodium salts (examples 1 to 8) prepared as described above, may be used after suitable purification directly in ink formulations as described below or may be were converted to other IJP-effective salts as follows. Each example was dissolved in distilled water. The solution was filtered and the volume of the filtrate adjusted to 4 liters. The solution was desalinated by reverse osmosis. The dissolved sodium salt may be converted into other salt [e.g. the potassium salt] by passing the solution through an ion-exchange column comprising Dowex HGRW resin statu-rated with a suitable solution [e.g. potassium hydroxide solution (5% w/v)]. The solution of the (e.g. potassium) salt thus obtained was then filtered and water was evaporated form the filtrate to yield a purified salt suitable for use directly in an ink as described below.

Inks

The effectiveness in ink jet printing of compounds of Formula (1) was demonstrated as follows. Inks separately comprising each exemplified dye were prepared by dissolv-ing 2 parts of the sodium salt, prepared as described above, in 98 parts of a mixture of water and 2-pyrrolidone (in a respective ratio of 90:10 by volume). The inks were printed onto gelatin paper (obtained from Felix Schoeller) using a thermal ink-jet printer to give a bright cyan prints which had excellent light fastness.

Further inks comprising the exemplified dyes may be may be prepared as described in the following tables in which the number in the first column (headed Ex. no.) denotes the example number of dye to be used in the ink. The dye may be in its free acid form and/or in the form of any IJP-effective salt (e.g. sodium, potassium or ammonium salt). Numbers quoted in the second column onwards refer to the number of parts of the relevant ingredient and all parts are by weight. The inks may be applied to paper by thermal or piezo ink jet printing.

The following abbreviations are used in the tables:

TABLE I

| Ex. no. | Dye | Water | PG | DEG | NMP | DMK | MEOH | 2P | MIBK |
|---|---|---|---|---|---|---|---|---|---|
| 1 | 2.0 | 80 | 5 | | 6 | 4 | | 5 | |
| 2 | 10.0 | 85 | 3 | | 3 | 3 | 5 | 1 | |
| 3 | 2.1 | 91 | | 8 | | | | | 1 |
| 4 | 2.4 | 75 | 3 | 4 | | 5 | 6 | | 5 |
| 5 | 5.1 | 96 | | | | 4 | | | |
| 6 | 1.8 | 80 | 5 | | | | | 15 | |
| 7 | 2.6 | 84 | | | 11 | | | 5 | |
| 8 | 3.3 | 80 | 2 | | | 10 | 2 | | 6 |
| 1 | 5.4 | 69 | 2 | 20 | 2 | 1 | | 3 | 3 |
| 2 | 7.0 | 70 | | | 15 | | 3 | | 10 |

PG = propylene glycol;
DEG = diethylene glycol;
NMP = N-methyl pyrollidone;
DMK = dimethylketone;
NaST = Na stearate
IPA = isopropanol;
MEOH = methanol;
2P = 2-pyrollidone;
MIBK = methylisobutyl ketone;
CET = cetyl ammonium bromide;
TBT = tertiary butanol;
TDG = thiodiglycol;
BDL = butane-2,3-diol;
PHO = $Na_2HPO_4$;
P12 = propane-1,2-diol.
CHL = cyclohexanol; and
PDL = pentan-1,5-diol.

TABLE II

| Ex. No. | Dye | Water | PG | DEG | NMP | NaOH | Na ST | IPA | 2P | MIBK |
|---|---|---|---|---|---|---|---|---|---|---|
| 3 | 2.0 | 70 | | 7 | | 6 | | 3 | | 2 |
| 4 | 4.0 | 65 | 4 | | 6 | | 0.7 | 5 | | |
| 5 | 1.0 | 50 | | 4 | | | | 5 | | 1 |
| 6 | 3.1 | 86 | 5 | | | 2 | 0.2 | 4 | | 5 |
| 7 | 1.1 | 81 | | 2 | 9 | 0.5 | 0.5 | | 9 | |

TABLE III

| Ex. no. | Dye | Water | PG | DEG | NMP | DMK | IPA | MEOH | 2P | MIBK |
|---|---|---|---|---|---|---|---|---|---|---|
| 8 | 3.1 | 86 | 5 | | | | 4 | | | 5 |
| 1 | 1.1 | 81 | | | 9 | | | | 9 | |
| 2 | 2.5 | 60 | 4 | 15 | 3 | 3 | 6 | 10 | 5 | 4 |
| 3 | 3.2 | 65 | | 5 | 4 | 6 | 5 | 4 | 6 | 5 |
| 4 | 10.0 | 80 | 2 | 6 | 2 | 5 | 1 | | 4 | |

TABLE IV

| Ex. no. | Dye | Water | PG | DEG | NMP | DMK | NaOH | Na ST | IPA |
|---|---|---|---|---|---|---|---|---|---|
| 5 | 3.0 | 90 | | 5 | 5 | | 0.2 | | |
| 6 | 5 | 65 | 5 | 20 | | | | | 10 |
| 7 | 4.1 | 80 | | 5 | 2 | 10 | | 0.3 | |
| 8 | 10.8 | 90 | 5 | | | | | | 5 |
| 1 | 12.0 | 90 | | | | 7 | 0.3 | | 3 |

TABLE V

| Ex. no. | Dye | Water | PG | DEG | NMP | CET | PHO | 2P | P12 |
|---|---|---|---|---|---|---|---|---|---|
| 2 | 3.0 | 80 | 15 | | | 0.2 | | 5 | |
| 3 | 9.0 | 90 | | | 5 | | 1.2 | | 5 |
| 4 | 2.5 | 90 | | 6 | 4 | | 0.12 | | |
| 5 | 3.1 | 82 | 4 | 8 | | 0.3 | | | 6 |
| 6 | 10.0 | 91 | | | 6 | | | 3 | |
| 7 | 5.0 | 78 | 5 | 11 | | | | 6 | |
| 8 | 6.0 | 63 | 3 | | 4 | | 2.0 | | |
| 1 | 3.0 | 72 | | 15 | | 0.8 | | | 3 |
| 2 | 5.4 | 86 | 5 | | 7 | | 3.0 | 7 | |
| 3 | 2.0 | 90 | | | 10 | | | | 10 |

TABLE VI

| Ex. no. | Dye | Water | PG | DEG | NMP | CET | TBT | TDG |
|---|---|---|---|---|---|---|---|---|
| 4 | 1.5 | 85 | 5 | 5 | | 0.15 | 5.0 | 0.2 |
| 5 | 9.0 | 90 | | 5 | 5 | | | 0.3 |
| 6 | 2.0 | 90 | | 10 | | | | |
| 7 | 2.0 | 88 | | | | | | 10 |
| 8 | 5.5 | 70 | 4 | | 4 | 0.4 | 3 | |

TABLE VII

| Ex. no. | Dye | Water | PG | DEG | NMP | TBT | TDG | BDL | PHO | 2P |
|---|---|---|---|---|---|---|---|---|---|---|
| 1 | 0.9 | 85 | | 10 | | | | 5 | 0.2 | |
| 2 | 4.0 | 70 | | 10 | 4 | | | 1 | | 4 |
| 3 | 2.2 | 75 | 4 | 10 | 3 | | | 2 | | 6 |
| 4 | 9.0 | 76 | | 9 | 7 | 3.0 | | | 0.95 | 5 |
| 5 | 2.1 | 70 | 5 | 5 | 5 | 0.2 | 0.1 | 5 | 0.1 | 5 |

TABLE VIII

| Ex. no. | Dye | Water | PG | DEG | NMP | TBT | TDG | 2P |
|---|---|---|---|---|---|---|---|---|
| 6 | 3.0 | 55 | | | 5 | 2.0 | | 3 |
| 7 | 6.0 | 65 | | 4 | | 0.1 | 5 | |
| 8 | 5.0 | 78 | | | 5 | | 12 | 5 |
| 1 | 8.0 | 70 | 2 | | 8 | | 15 | 5 |
| 2 | 10.0 | 80 | | | | | 8 | 12 |

TABLE IX

| Ex. no. | Dye | Water | PG | DEG | NMP | BDL | PHO | 2P | P12 |
|---|---|---|---|---|---|---|---|---|---|
| 3 | 10.0 | 75 | 3 | | 5 | 3 | | 3 | 1 |
| 4 | 3.5 | 80 | | 6 | | | | | 5 |
| 5 | 2.0 | 90 | 7 | | | 7 | 0.5 | | |
| 6 | 6.0 | 65 | | | 5 | | | 2 | |
| 7 | 4.0 | 70 | | 10 | 4 | 1 | | 4 | 11 |

TABLE X

| Ex. no. | Dye | Water | PG | DEG | NMP | CET | TBT | TDG | BDL | PHO | 2P |
|---|---|---|---|---|---|---|---|---|---|---|---|
| 8 | 1.5 | 80 | 1 | 2 | 3 | 0.5 | 0.4 | | 7 | 2 | 10 |
| 1 | 3.0 | 60 | | 4 | | 2.0 | | 0.5 | | | |
| 2 | 4.5 | 90 | | 3 | 6 | | 7.0 | | 1 | 3 | 2 |
| 3 | 3.0 | 95 | | 7 | | 4 | | 3 | | 0.5 | |
| 4 | 2.1 | 70 | 5 | 5 | 5 | 0.1 | 0.2 | 0.1 | 5 | 0.1 | 5 |

TABLE XI

| Ex. no. | Dye | Water | PG | DEG | NMP | CHL | PHO | 2P | PDL |
|---|---|---|---|---|---|---|---|---|---|
| 5 | 7.0 | 75 | 3 | | 5 | 3 | | 3 | 1 |
| 6 | 3.5 | 60 | | | 2 | | | | 5 |
| 7 | 2.0 | 90 | 7 | | | 7 | 1.5 | | 2 |
| 8 | 6.0 | 65 | | | 5 | | | 2 | |
| 1 | 4.0 | 70 | | 5 | 4 | 1 | | 4 | 12 |

What is claimed is:

1. A compound of Formula (1):

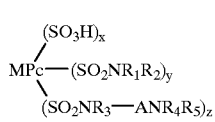

Formula (1)

which includes all IJP-effective forms of such compounds; and in which

M represents Cu or Ni;

Pc represents a phthalocyanine nucleus of Formula (2)

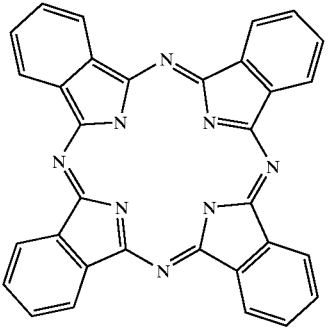

FORMULA (2)

$x+y+z$ represents an average from 3 to 4; and z may be zero;

A represents $C_{1-4}$-alkylene;

$R_1$, $R_3$ each independently represent H or $C_{1-4}$-alkyl;

$R_4$ represents H; or $C_{1-4}$-alkyl optionally substituted with hydroxy;

$R_5$ represents a carboxylic acid substituted aryl group; and $R_2$ represents H, $C_{1-4}$-alkyl or a group of formula BD where B represents $C_{1-4}$-alkylene; and D represents $NR_6R_7$; or $SC_{1-4}$-alkyleneSO$_3$H;

where $R_6$ represents H; or $C_{1-4}$-alkyl;

$R_7$ represents H; $C_{1-4}$-alkyl substituted by morpholino; or $R_6$ and $R_7$ together with the N atom to which they are attached form a morpholino ring;

provided that y is not zero; and, provided further, that when z is 0, and $R_1$ is H then $R_2$ represents BD.

2. An ink effective for use in ink jet printing, comprising a medium and a colorant comprising an IJP-effective compound of Formula (1) as claimed in claim 1.

3. A process for printing a substrate with an ink as claimed in claim 2, using an ink-jet printer.

4. A substrate being printed with an ink as claimed in claim 2, the substrate selected from one or more of: paper, an overhead projector slide and a textile material.

5. A process for the colouring a textile material with an ink as claimed in claim 2, the process comprising the steps of:
   i) applying the ink to the textile material by ink-jet printing; and
   ii) heating the textile material at a suitable temperature to fix the ink on the material.

6. A compound as claimed in claim 1 wherein: $R_1$, $R_2$, $R_3$ and $R_4$ are H; A is —CH$_2$CH$_2$—; and $R_5$ is carboxylic acid substituted phenyl.

7. A compound as claimed in claim 1 wherein $R_5$ is 3-carboxyphenyl.

8. A compound as claimed in claim 1 wherein (x+y)>z.

9. A compound as claimed in claim 1 wherein x>y.

10. An ink according to claim 2 wherein the medium comprises water and an organic solvent.

11. The compound of Formula (1) as claimed in claim 1, wherein when z is 0 and $R_1$ is H, then M represents Cu, and $R_2$ represents BD where B represents —$CH_2CH_2$— and D represents $NR_6R_7$.

12. An ink effective for use in ink jet printing, comprising a medium and a colorant comprising an IPJ-effective compound as set forth in claim 11.

13. An ink according to claim 12, wherein the medium comprises water and organic solvent.

14. A process for printing with an ink as claimed in claim 12, using an ink-jet printer.

15. A substrate printed with an ink as claimed in claim 12, the substrate being one or more of paper, overhead projector slide or textile material.

16. A process for colouring a textile material with an ink as claimed in claim 12, comprising i) applying the ink to the textile material by ink-jet printing; and ii) heating the textile material at a temperature to fix the ink on the material.

\* \* \* \* \*